United States Patent [19]
Berges et al.

[11] Patent Number: 5,655,753
[45] Date of Patent: Aug. 12, 1997

[54] OCEAN BOTTOM CABLE HANDLING SYSTEM AND METHOD OF USING SAME

[75] Inventors: Larry Berges, New Iberia; Steve Bullard, Loreauville, both of La.

[73] Assignee: Regional Fabricators, Inc., New Iberia, La.

[21] Appl. No.: 527,577

[22] Filed: Sep. 13, 1995

[51] Int. Cl.$^6$ ................................................. B63B 35/03
[52] U.S. Cl. ........................... 254/134.3 SC; 405/168.4; 405/173
[58] Field of Search ..................... 254/134.3 SC, 254/134.5, 265, 287, 382; 226/181, 186; 405/168.3, 168.4, 173

[56] References Cited

U.S. PATENT DOCUMENTS

| | | |
|---|---|---|
| 1,703,777 | 2/1929 | Pernot . |
| 2,067,717 | 1/1937 | Lawton et al. ............... 254/134.3 SC |
| 2,659,549 | 11/1953 | Galin . |
| 2,924,328 | 2/1960 | Lidderdale ................. 254/134.3 SC |
| 2,973,919 | 3/1961 | Goldrick et al. ............ 254/134.3 SC |
| 3,038,648 | 6/1962 | Kingston .................... 254/134.3 SC |
| 3,093,333 | 6/1963 | Bishop . |
| 3,136,529 | 6/1964 | Dickinson et al. ........... 254/134.3 SC |
| 3,237,438 | 3/1966 | Tesson ........................ 405/168.3 |
| 3,275,300 | 9/1966 | Delacour et al. ............ 254/265 |
| 3,448,962 | 6/1969 | Miller . |
| 3,630,461 | 12/1971 | Suganti et al. . |
| 3,658,222 | 4/1972 | Dressel et al. ............... 405/168.4 |
| 3,717,325 | 2/1973 | Peterson ...................... 254/382 |
| 3,719,348 | 3/1973 | Wells . |
| 3,843,096 | 10/1974 | Wilson et al. . |
| 4,218,025 | 8/1980 | Andrews . |
| 4,254,940 | 3/1981 | Thyvold . |
| 4,274,799 | 6/1981 | Tisdale, III et al. . |
| 4,540,159 | 9/1985 | Jordan . |
| 4,570,245 | 2/1986 | Thigpen . |
| 4,581,723 | 4/1986 | Savit . |
| 4,596,492 | 6/1986 | Monti et al. . |
| 4,647,253 | 3/1987 | Jacobsen et al. . |
| 4,676,483 | 6/1987 | Magill . |
| 4,721,285 | 1/1988 | McMichael . |
| 4,828,223 | 5/1989 | Russell et al. . |
| 5,013,186 | 5/1991 | Kakizaki ....................... 405/168.3 |
| 5,175,989 | 1/1993 | Messina . |
| 5,197,716 | 3/1993 | Ziliblich, Jr. et al. . |
| 5,199,659 | 4/1993 | Ziliblich, Jr. . |
| 5,217,176 | 6/1993 | Hall . |
| 5,284,323 | 2/1994 | Pawkett . |
| 5,369,884 | 12/1994 | Chen . |

FOREIGN PATENT DOCUMENTS

| | | | |
|---|---|---|---|
| 932302 | 7/1963 | United Kingdom | .......... 254/134.3 SC |
| 2242882 | 10/1991 | United Kingdom | .................. 226/186 |

Primary Examiner—Robert C. Watson
Assistant Examiner—Thomas W. Lynch
Attorney, Agent, or Firm—Joseph T. Regard, Ltd.

[57] ABSTRACT

A marine seismic cable deployment and retrieval system for utilization in conjunction with a marine vessel. The present, searched for invention teaches a large wheel mounted in the front of the vessel for retrieving seismic cable from the water, and a horizontally mounted cable handler comprising an eight wheel cable puller for pulling the cable, the cable puller comprising four pairs of tires in frictional, rotational contact with one another along their outer surfaces configured to frictionally grab and pull a seismic cable along a linear path. A smaller rear cable puller further urges the cable to the rear of the vessel, and down into the main deck via a chute arrangement. The cable pullers of the present invention contemplate the utilization of relatively oversized, under-inflated tires to allow for a softer, increased frictional contact with the cable, while allowing for the tires to "give" with the passage of cable connectors therethrough, which typically have a greater diameter than the cable, allowing for full, real-time cable retrieval. The present system further contemplates a trolley assembly/floating cable puller system for deploying the cable into the main deck for installation, as well as deploying the cable to sea, which trolley system includes a floating cable wheel puller arrangement having movement on both the longitudinal and transverse axes of the vessel, allowing flexible placement of the cable in the main deck area.

19 Claims, 10 Drawing Sheets

OCEAN BOTTOM CABLE HANDLING SYSTEM AND METHOD OF USING SAME

TECHNICAL FIELD OF THE INVENTION

This invention relates to cable handling systems, and in particular to a marine seismic cable deployment and retrieval system for utilization in conjunction with a marine vessel.

The present invention teaches a large wheel mounted in the front of the vessel for retrieving seismic cable from the water, and a horizontally mounted cable handler comprising an eight wheel cable puller for pulling the cable, urging same to the main deck area of the vessel, the cable puller comprising four pairs of tires configured for frictional, rotational contact another along their outer surface, to frictionally grab and pull a seismic cable along a linear path. A smaller rear cable puller further urges the cable to the rear of the vessel, and down into the main deck via a chute arrangement.

The cable pullers of the present invention contemplate the utilization of relatively oversized, under-inflated tires to allow for a softer, increased frictional contact with the cable, while allowing for the tires to "give" with the passage of cable connectors therethrough, which typically have a greater diameter than the cable, allowing for full, real-time cable retrieval without the necessity of having to individually spool the connectors through the wheel pullers, which typically was necessary with prior art cable handling arrangements.

The present system further contemplates a trolley cable deployment system for deploying the cable into the main deck for installation, as well as to sea, which trolley system includes a floating cable wheel puller arrangement having movement on both the longitudinal and transverse axis of the vessel, allowing flexible placement of the cable in the main deck area.

The system of the present invention provides a relatively low maintenance cable handling system which requires less manual labor, resulting In a safer operation.

BACKGROUND OF THE INVENTION

Although the prior art has contemplated various and diverse wheeled cable pullers, none have contemplated the system of the present invention.

The following patents are considered to be at least of general pertinence to the present invention:

| U.S. Pat. No. | Inventor | Date of Issue |
|---|---|---|
| 5,284,323 | Pawkett | 02/08/1994 |
| 5,217,176 | Hall | 06/08/1993 |
| 5,199,659 | Ziliblich, Jr. | 04/06/1993 |
| 5,197,716 | Zibilich, Jr. et al | 03/30/1993 |
| 4,596,492 | Monti et al | 06/24/1986 |
| 4,581,723 | Savit | 04/08/1986 |
| 4,570,245 | Thigpen | 02/11/1986 |
| 4,540,159 | Jordan | 09/10/1985 |
| 4,676,483 | Magill | 06/30/1987 |
| 4,581,723 | Savit | 04/08/1986 |
| 4,254,940 | Thyvold | 03/10/1981 |
| 3,843,096 | Wilson, deceased et al | 10/22/1974 |
| 3,719,348 | Wells | 03/06/1973 |
| 3,630,461 | Suganti et al | 12/28/1971 |
| 3,448,962 | Miller | 06/10/1969 |
| 3,093,333 | Bishop | 06/11/1963 |
| 2,659,549 | Galin | 11/17/1953 |
| 1,703,777 | Pernot | 02/26/1929 |

U.S. Pat. No. 4,570,245, issued 1986 teaches in column 3, discussion of FIG. 3 (line 8) a tensiometer 32 comprising a sheave communicating with a cable, the sheave situated upon a linear path, and traversing that path in order to maintain constant tension on said cable. U.S. Pat. No. 4,581,723 teaches in large part the same invention as '245, and is attributed to the same inventor.

U.S. Pat. No. 4,540,159 teaches a cable tensioner operating along the same lines, but with vertical rather than horizontal linear movement of the sheaves. U.S. Pat. No. 3,448,962 also contemplates a vertically traversing sheave for tensioning.

U.S. Pat. No. 3,093,333, issued 1963, teaches a cable handling vessel having a retrieval ramp (5), a cable retrieval engine (4), and means to stow the cable below deck. Also included is a discussion (cols 1,2) of "lump" storage of cable on the deck.

U.S. Pat. No. 1,703,777 also contemplates a submarine cable deployment, retrieval system, including cable guide means for stowing same below deck. Also discussed is the problems with stowing cable in "lumps", and the associated tangling and knotting therewith.

The remaining patents teach various distinguishable systems for tensioning seismic cable or the like.

As may be discerned by a review of the above patents, the prior art has failed to teach a cable handling system which is specifically configured to easily and without manual intervention deploy and retrieve seismic cable, even in high seas.

Further, the prior art has failed to teach or contemplate a cable puller which can effectively pull the full length of seismic cable, including the connectors, without having to adjust the wheel pullers.

Lastly, the prior art has failed to teach or contemplate a cable trolley system which effectively directs cable into the main deck in lump storage, without knotting or binding.

GENERAL SUMMARY DISCUSSION OF THE INVENTION

Unlike the prior art, the present invention provides a seismic cable deployment/retrieval system which is quicker, more efficient, and cost effective than earlier systems, and, perhaps most importantly, as safe as the present system, which requires less manual interaction than prior art systems.

The preferred embodiment of the present system is specifically configured to handle bottom cable, which is more difficult to handle than other seismic cables. Nonetheless, the system is suitable for utilization in conjunction with all seismic cable operations.

The preferred embodiment of the present invention is contemplated to be utilized in conjunction with seismic vessel, such as, for example, a 198 foot work boat, which may be utilized, in the exemplary embodiment of the present invention, with 7,000 feet of bottom type, 1.4 inch diameter seismic cable, having four inch connectors; this configuration is currently in use on such a work boat.

The cable is designed to be stored and deployed from the main deck of the vessel by the utilization of a trolley assembly/floating cable puller system, for deploying the cable into the sea, as the vessel moves in a forward direction.

For retrieval, the vessel comes about such that the bow or forward portion of the vessel is adjacent to the end of the cable to be retrieved, and the end is hauled up such and passed through a bow retrieval wheel on the upper deck of the vessel, in the exemplary embodiment, located on the starboard side of the vessel.

From the retrieval wheel, the cable passes through a front cable puller, the cable puller mechanism specifically configured to pull seismic cable having connectors which may have a larger diameter than the rest of the cable, without the necessity of special wheel gripper spacing mechanisms.

The cable, once it passes through the front cable puller assembly, is guided along a cable tray system the length of the vessel, through a cable tray, wherein the cable further passes through a rear cable puller, which directs the cable on to the end of the cable tray, and down through a generally vertically situated chute, which directs said cable to the lower, main deck of the vessel.

Once on the main deck, the cable is directed along the floor of the main deck via a trolley assembly, comprising a floating wheel cable puller which is supported by a gantry, said floating wheel cable puller configured to be maneuverable both along the longitudinal as well as transverse axis of the vessel, as well as vertical, and can thereby be positioned throughout the main deck. The trolley, manipulates the cable in the storage bin into a pile or lump, along the length of the storage bin, beginning in the front and working back.

The cable pullers of the present invention contemplate the utilization of relatively oversized, under-inflated tires to allow for a softer, increased frictional contact with the cable, while allowing for the tires to "give" with the passage of cable connectors therethrough, which typically have a greater diameter than the cable, allowing for full, real-time cable retrieval without the necessity of having to individually spool the connectors through the wheel pullers, which typically was necessary with prior art cable handling arrangements.

Unlike the prior art, the present system allows for a relatively hands off, fully mechanical deployment and retrieval of the vessel, with only nominal personnel handling of the cable necessary. In the present embodiment, the cable puller mechanisms and trolley are controlled by personnel via control stations. An alternative embodiment of the present invention, however, provides for a fully automated control of the cable handling process, via sensor monitoring and control system.

The present system, requiring nominal manual interaction, is highly suitable for use under rough sea conditions, such as the North Sea, as well as extended deployments, which might typically deplete available personnel on board.

In addition, the present system provides a quicker, more consistent cable deployment/retrieval cycle under any condition, due to the lack of extensive manual intervention.

It is therefore an object of the invention to provide a seismic cable deployment and retrieval system which requires only nominal manual interaction.

It is another object of the present invention to provide a system for rapid deployment and retrieval of seismic cable, in a manner which nonetheless is safe and non-damaging to the seismic cable.

It is still another object of the present invention to provide a cable deployment/retrieval system which may be utilized in relatively high seas.

It is still another object of the present invention which provides a more rapid deployment and retrieval of seismic cable than prior art systems.

It is still another object of the present invention to provide an automated system for deployment and retrieval of seismic cable.

It is another object of the present invention to provide a system for deployment and retrieval of seismic cable which may be utilized on longer mission intervals, with less crew, than prior art systems.

It is still another object of the present system to provide a seismic cable deployment and retrieval system which includes cable handling equipment which provides for efficient, non-damaging handling of the seismic cable, and which allows for the passage of larger diameter connectors therethrough without having to adjust the separation spacing of said equipment.

Lastly, it is an object of the present invention to provide for a lump storage of seismic cables in a manner which effectively prevents knotting or binding.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1:
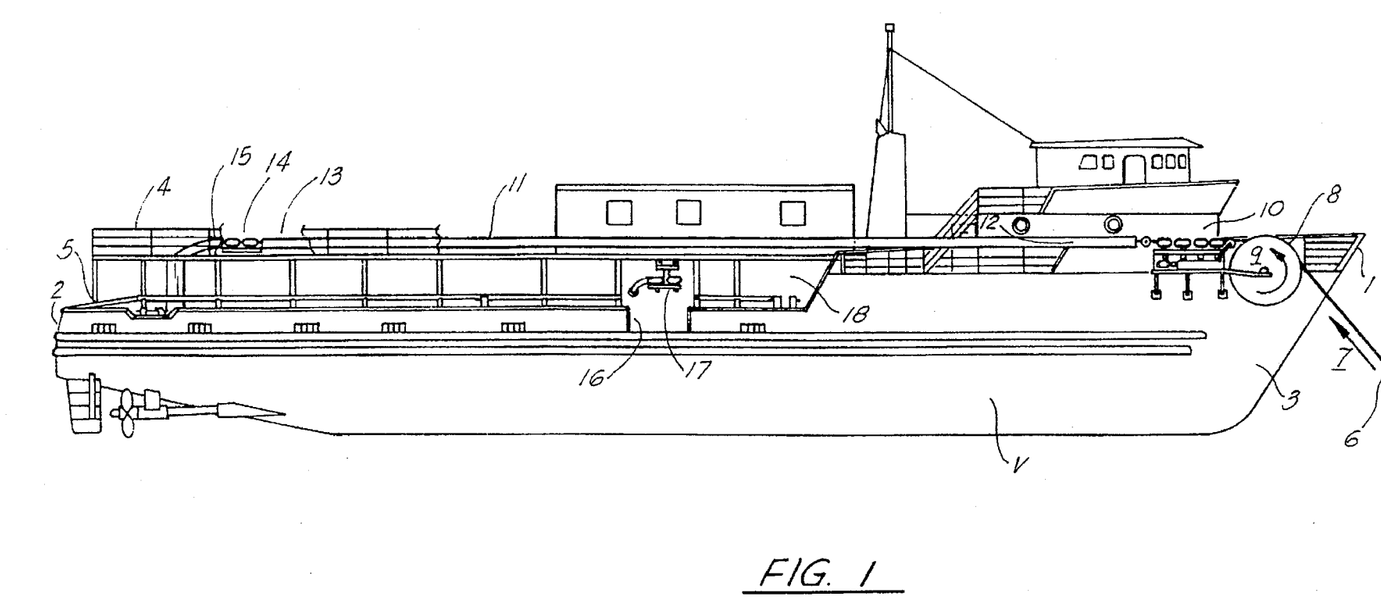
FIG. 1 provides a side view of the cable deployment/retrieval system of the present invention, further illustrating an exemplary vessel upon which the system is provided, as well as an exemplary cable during retrieval.

As shown in FIG. 1, the exemplary, preferred embodiment of the present invention is contemplated for utilization in conjunction with a vessel V having a bow 1 or forward end, a stern 2 or rear end, a port and starboard 3 sides, an upper level deck 4 and a main level deck 5.

The present system is configured for the deployment and retrieval of seismic type cable, the exemplary embodiment of the present invention operating in conjunction with bottom type seismic cable.

During seismic operations, lengths of rather heavy and cumbersome seismic cable are deployed from the stern of the vessel and, once deployed, said cable is utilized to monitor seismic activity, particularly for hydrocarbon exploration purposes. Retrieval of the cable has been a difficult and somewhat manually intensive task, and while prior systems utilized devices for pulling cable from the water, none are believed to have provided a system which did not require extensive hands-on control of the cable.

For a general overview of the present system, the exemplary embodiment of the present system retrieves cable 6 from the water 27 from the bow of the vessel, utilizing a rather large, vertically situated bow retrieval wheel 8 which freely rotates 9 as the cable is being pulled 7 via a forward wheel puller 10.

Figure 2:
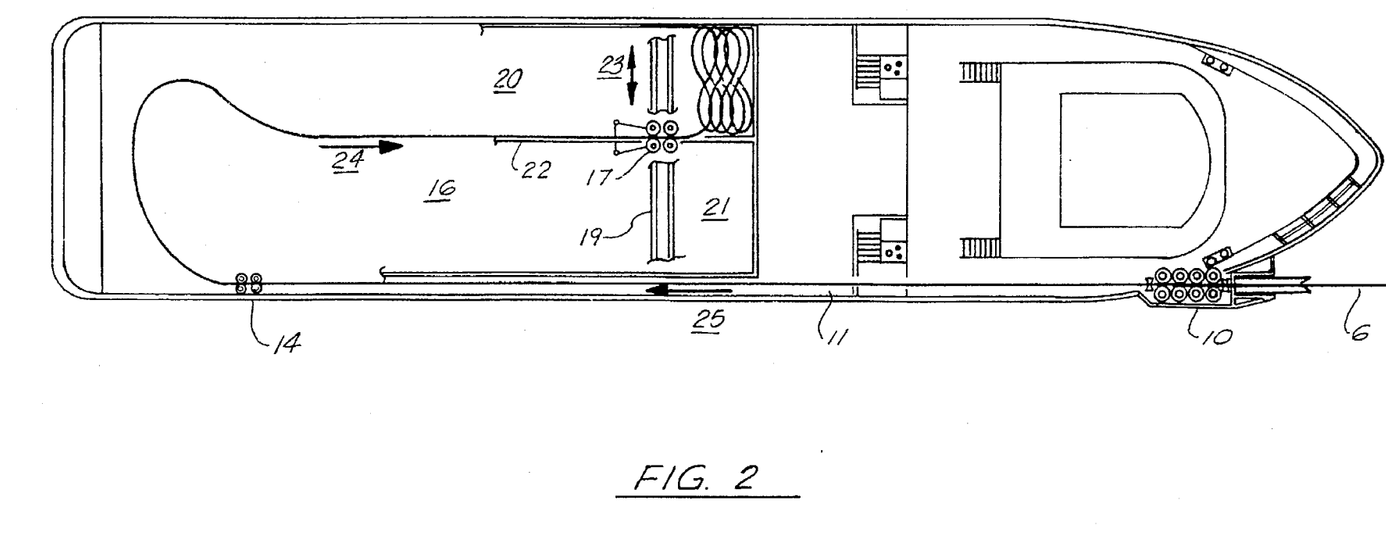
FIG. 2 provides a top, partially cut-away view of the cable deployment/retrieval system of FIG. 1, illustrating the various elements of the cable deployment/retrieval system and their respective locations on an exemplary vessel, as well as an exemplary cable being retrieved and stored.

From the forward wheel puller, the cable is placed upon the forward end 12 of a cable tray 11, which runs generally the length of the vessel, the cable sliding (25 in FIG. 2) along the length of the tray 11 and exiting at the rear portion 13 of the tray, wherein said cable passes through a rear cable puller 14, urging said cable through a cable chute, which in turn deposits the cable upon the main deck level Referring to FIG. 2, the cable then passes through a cable puller trolley 17, which pulls 24 and positions the cable, depositing it in this figure into the front portion 18 of the cable bin area on the main deck, as would occur in the early stages of a typical cable retrieval operation.

The trolley is further maneuvered throughout the retrieval operation as the cable pile grows in the cable bin, laying out the cable in a manner so as to avoid binding or knots. The trolley is mounted upon an overhead gantry 19, allowing for the transversal 23 and longitudinal positioning of the trolley throughout the main deck area.

As shown the cable storage area may be divided into first and second bins 20, 21, respectively, via dividing wall 22; this feature has been found to be particularly advantageous in high sea operating conditions, so as to better support the cable piles and prevent shifting thereof.

Figure 3:
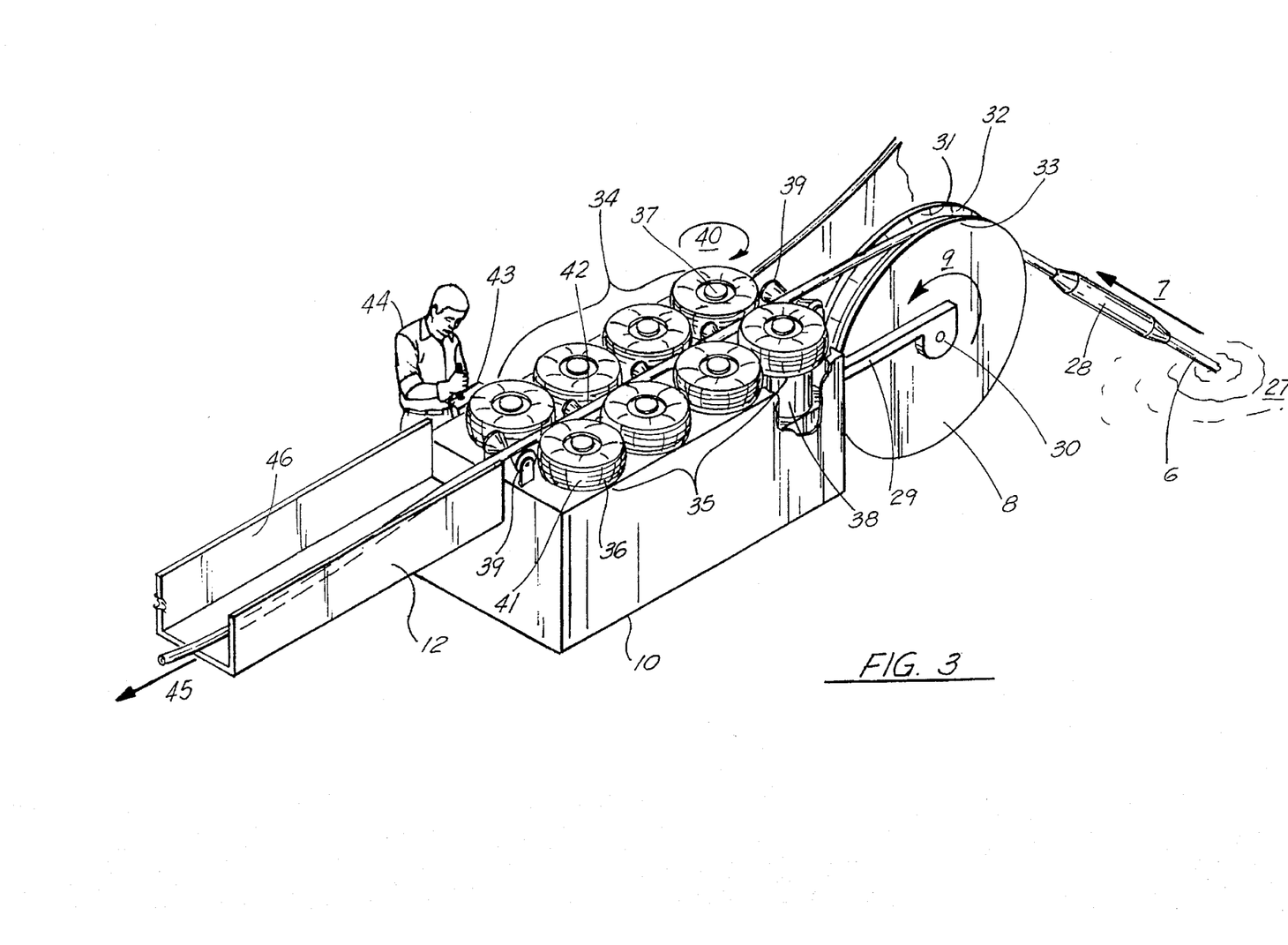
FIG. 3 provides an isometric, partially cut-away view of the cable deployment/retrieval system of the invention of FIG. 1, illustrating a more detailed view of the bow retrieval wheel and eight wheel front cable puller pulling a seismic cable.

For a more detailed discussion of the retrieval system of the preferred, exemplary embodiment of the present invention, we refer to FIG. 3. During the retrieval operation, the cable end to be retrieved would typically have a retrieval buoy affixed thereto, which would be retrieved via grappling hook or the like via the crew. The cable end would then be lifted, placed over the wheel 8, and threaded through the front cable puller 10.

The bow retrieval wheel 8 of the preferred, exemplary embodiment of the present invention is about nine feet (9') in outer diameter, and is free wheeling utilizing TEFLON bushings and bearings for low maintenance. The preferred embodiment is aluminum in construction so as to be non-corrosive. The diameter of the wheel can vary depending upon the application, and is anticipated to run anywhere from three feet (3') to twenty feet (20') in diameter.

The wheel 8 is situated in the present system in a generally vertical fashion along the starboard side of the bow of the vessel above the water, and is supported by a frame 29 which engages the axis 30 of the wheel. The wheel includes a hub 31 portion about its outer diameter, which is coated, for example, with a one inch bed 32 of high density neoprene, or vulcanized rubber, to protect and cushion the cable from possible damage. The wheel is configured to lift and support the cable 6, including any connectors 28, along the wheel upper portion 33, allowing the cable to ride over said wheel, said cable thereafter engaging the front wheel puller 10, which is directly behind and aligned with the wheel 8. Thusly, the wheel is positioned so as to lift, align, and steer the cable from the water, for passage through said front wheel puller 10.

Once having been lifted from the water and aligned by the wheel puller, the cable next is pulled and guided by the eight wheel cable puller, comprising first 34 and second 35, horizontally situated sets of rotatable wheels, paired so as to contact the cable and pull it along.

As shown, the present system utilizes inflated tires 36 on hubs as the wheels, each of the tires supported via a vertical axle 37, which in turn is rotated via pneumatic or electric motor 38 or the like. The preferred, exemplary embodiment of the present invention utilizes eight respective motors, one for each wheel, utilizing a Charlyn model #104, 2000 series hydraulic motor with 11.9 cubic inches displacement. The unit is powered by a 50 horsepower electric motor operating at 25 GPM.

Rollers 39, 39' may be provided to position the cable so as to contact the outer diameters of the tires, between the respective pairs.

As further illustrated, the pairs of tires are configured so as to be spaced 42 such that the cable runs between the respective pairs of tires (along the outer diameter 41 of the tires) with sufficient force so as allow said rotating tires to frictionally pull said cable, upon the powered rotation of said tires. The spacing and rotational speed of the respective pulling pairs of tires may be varied, as necessary, via control box 43, which may be operated by personnel 44, or may be automatic, with the utilization of appropriately placed sensors and switches.

During cable retrieval operations, the shipside tires would rotate in a clockwise 40 fashion, as the opposing tires would rotate in a counterclockwise fashion, thereby frictionally urging said cable along 45 in a forward manner, into the front portion 12 of the cable tray (11 in FIG. 1). Further, the directions would be reversible as necessary, for drawing the cable backward. In addition, sensors may be provided to monitor the pulling force of the cable, especially in rough seas, and the cable puller controls may be configured so as to slow, stop, or reverse when the sensor indicates excessive pulling force on the cable.

Likewise, the vessel speed control may be linked to the speed of the cable puller, so as to facilitate the quickest, least stress means of retrieving the cable.

The tires are oversized and to some degree, under-inflated, to allow for the "soft" gripping of the cable, providing sufficient gripping for pulling said cable, while allowing said tires to give in with the passage of a larger diameter connector 28 therethrough, so as not to have to vary the mechanical space between the tires during the retrieval of the cable.

The preferred, exemplary embodiment of the front eight wheel cable puller is designed to run at a top operating speed of 97 RPM each wheel with the present components. Each pair of wheels is capable of providing 315 pounds of line pull, providing a total of 1260 pounds of line pull alone, without assistance from other cable pullers in the system. More details on the operation of the cable puller will be discussed infra.

Referring to FIGS. 1, 2, and 3, the tray 11 runs generally the length of the starboard side of the vessel, along the upper level deck, and is lined 46 with ultra high molecular weight (UHMW) TEFLON sheet material, so that the cable will slide easily to the rear of the vessel. In the present, exemplary embodiment, the trays are about one hundred feet (100') long.

Figure 4:
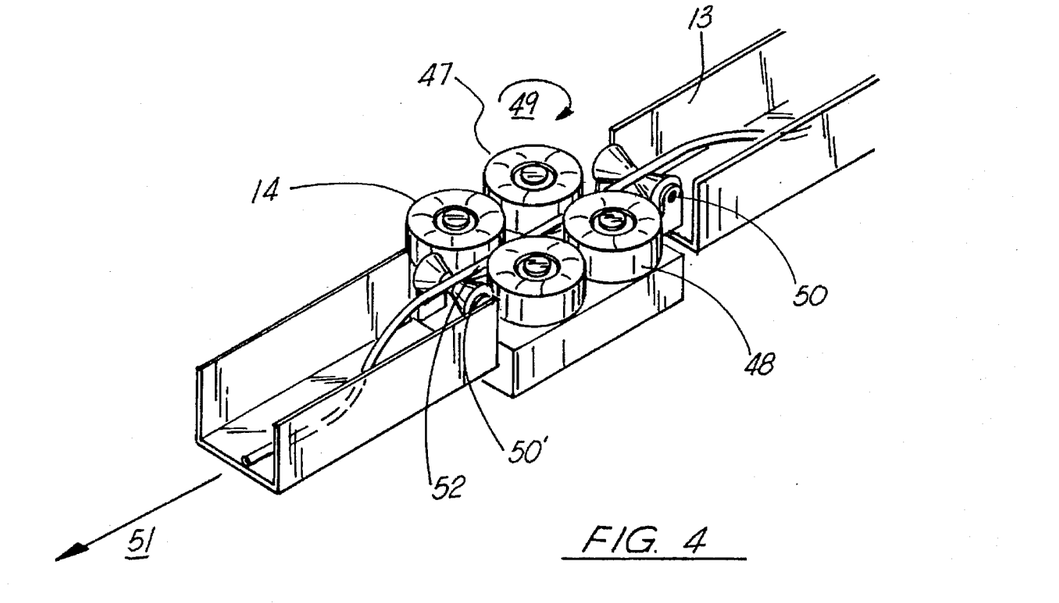
FIG. 4 provides an isometric view of the cable deployment/retrieval system of the invention of FIG. 1, illustrating with particularly the cable tray and rear cable puller.

Referring to FIG. 4, located at the rear end 13 of the tray is the rear cable puller, which the preferred embodiment of the present invention contemplates as being a two wheel puller, but may also include a four wheel puller, as shown, which may be advantageous on longer ships, for example. The puller is arranged of first 47 and second 48 sets of puller wheels arranged in horizontal fashion, and operates along the same methodology and arrangement as the front eight wheel cable puller, supra.

The rear cable puller 14 may further include front 50 and rear 50' rollers situated at the ingress and egress points of the puller, as well as between the sets of rollers, in systems with more than two wheels, for better positioning the cable between the drive wheels.

The rear cable puller 14 pulls the cable down through the trays, and further drives the cable 51 to the chute to the lower, main deck, as will be further discussed below. This unit has the same type hydraulic motors as the front cable puller, and may be powered 49, if desired, by the power pack on the front unit so that both units run in series and at the same speed, thereby providing uniform control of the cable passing therebetween.

Figure 5:
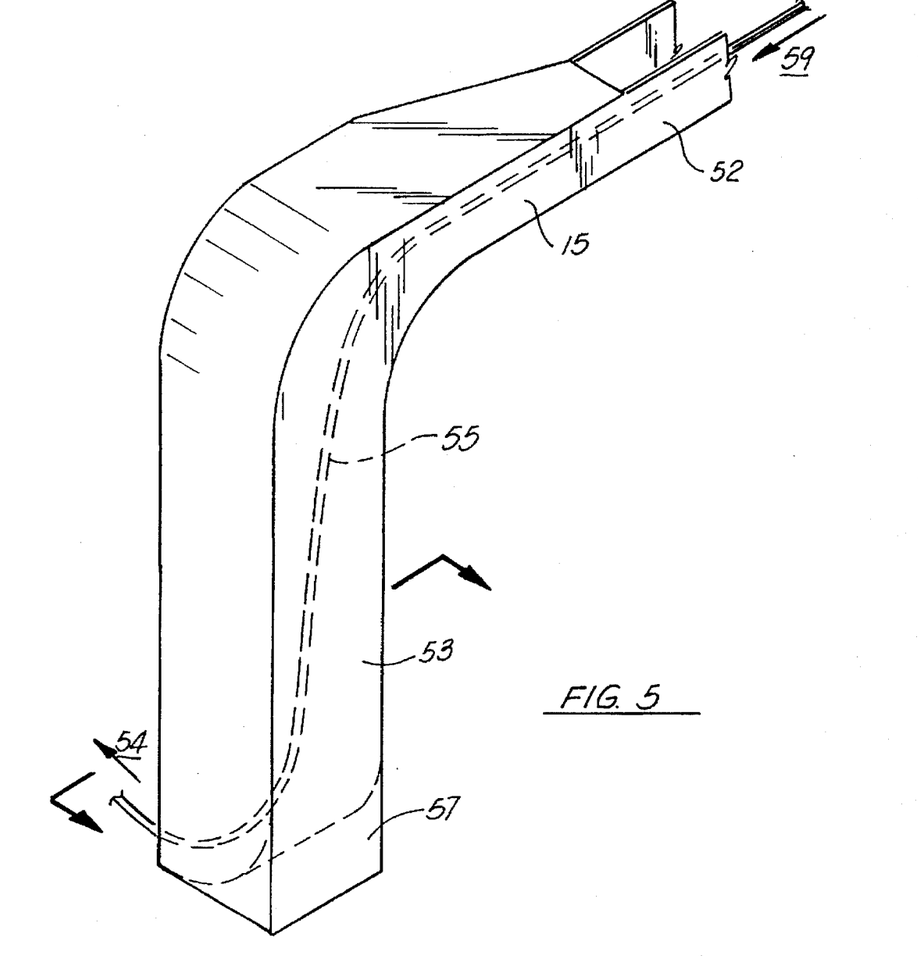
FIG. 5 provides an isometric view of the cable deployment/retrieval system of the invention of FIG. 1, illustrating particularity the cable chute for guiding the cable from the upper deck to the main deck.
Figure 6:
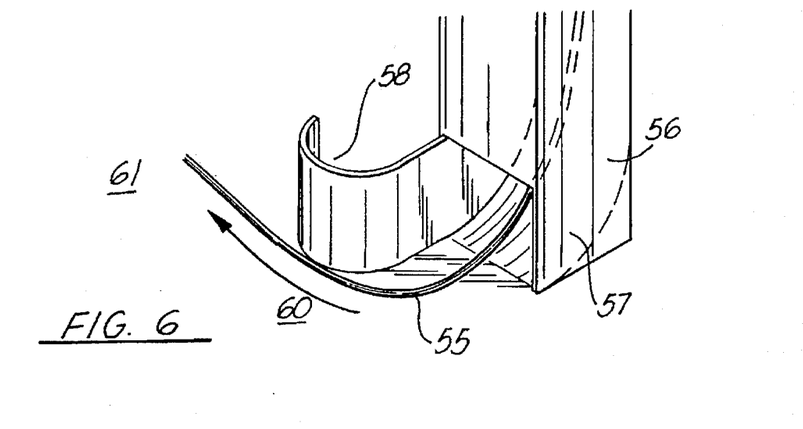
FIG. 6 provides an isometric view of the cable deployment/retrieval system of the invention of FIG. 1, illustrating particularly the lower portion of the cable chute of FIG. 5.

Referring now to FIGS. 5 and 6, once the cable has been drawn through the rear cable puller, it is urged 59 into the upper, horizontal, generally opening 52 of the cable chute 15, which is configured to direct the cable 55 from its longitudinal path at the upper level, generally vertically 53 down to the main deck level, to be deposited in a generally transversal 54 fashion on to the main deck level 61.

At the lower section 57 of the chute may be provided a radial slide 56 for urging the cable along in a non-damaging fashion; also, a lip 58 may be provided to further guide 60 the cable along the path generally towards the bow of the ship.

The chute may also be configured, as necessary and desirable, such that the cable is deposited in a generally reverse longitudinal fashion, with the cable running out onto the main deck directly towards the bow of the ship, as opposed to the transverse discharge, above.

Figure 7:
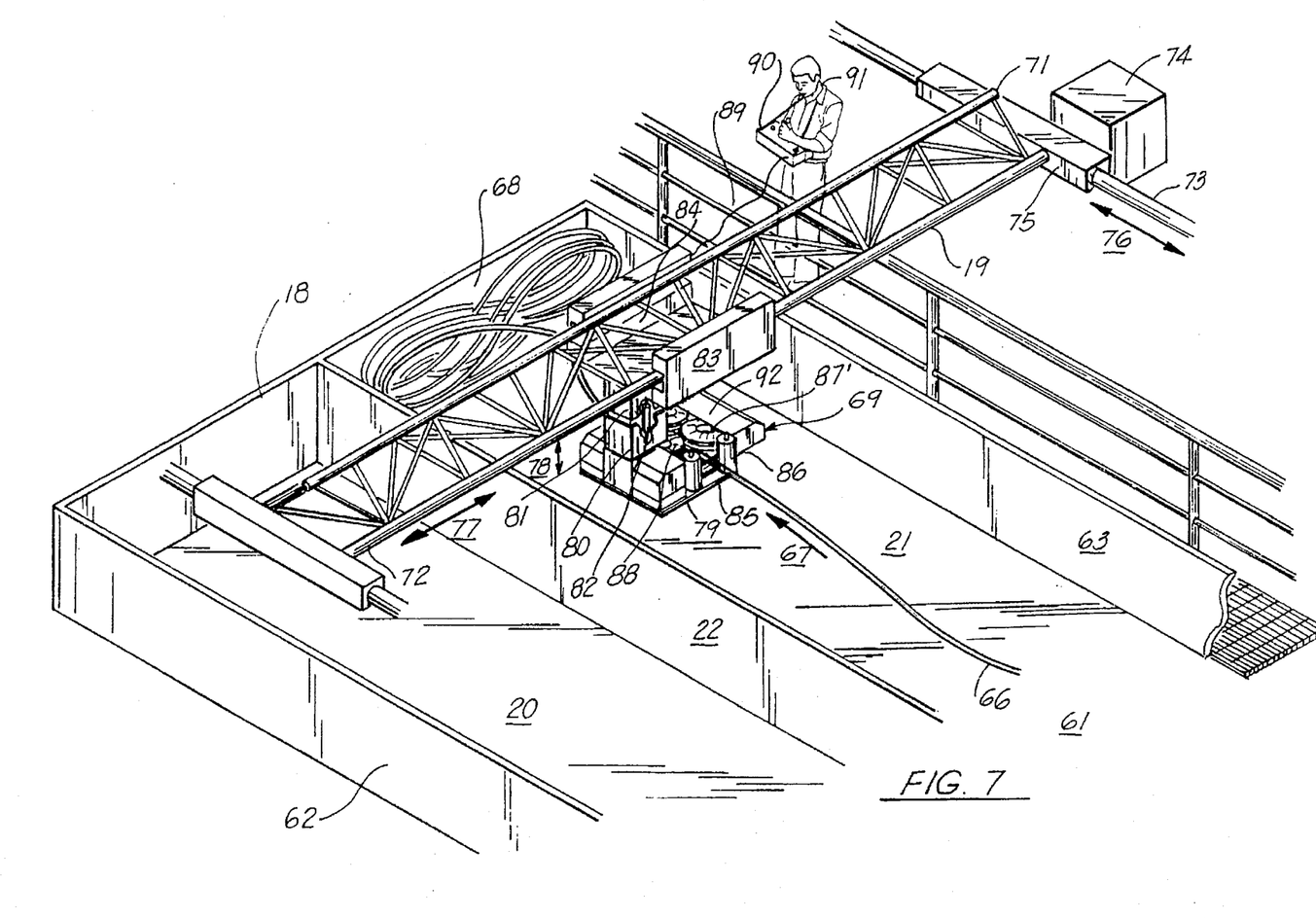
FIG. 7 provides an upper isometric view of the cable deployment/retrieval system of the invention of FIG. 1, illustrating the operation of the cable trolley system deploying cable into the cable storage bin.

Referring to FIG. 7, the main deck level 61 includes a cable storage area, running from generally the back of the main cabin to the rear of the boat, and comprising in the exemplary embodiment first 21 and second 20' cable storage bins, formed by a dividing wall 22 and contained by side walls 63, 62, respectively, and end wall, situated at the front portion 18 of the main deck. The cable retaining walls in the exemplary embodiment are about four feet (4') high, and fabricated with 3/16" plate.

Floating above the cable storage area is trolley assembly 69, which supports a floating cable puller 79 for motivating or pulling 67 cable 66, urging same into a pile 68 in the storage bin. The cable puller 79 includes an ingress opening 85 (or egress opening, depending upon the desired pulling direction) which receives the cable, which cable is pulled via first 87' and second 88 sets of horizontally situated puller wheels, each supported via vertical axis 87 and driven via motor 92. The floating cable puller may be a two or four wheel puller, as preferred and desirable, and it is constructed and operates in the same fashion as set forth with the cable pullers discussed supra.

The floating cable puller 79 is supported by a gantry 70 having first 71 and second 72 ends, each end of the gantry slidingly supported, via rolling support members 75, by a longitudinal support member 73, said longitudinal support members running along opposing lengths along the underside of the upper level deck, and extending from the back of the main cabin to the rear of the vessel. A motor 74 is provided with the rolling support members at each end of the gantry to motivate said gantry along said longitudinal support members, thereby moving the gantry in a generally longitudinal direction 76 along the vessel's main deck. In the preferred, exemplary embodiment of the present invention, the trolley moves about 150 feet per minute in a direction generally longitudinally aligned with the axis of the vessel, The trolley assembly 69 may also be motivated in a side to side direction, i.e., movement transversal 77 to the longitudinal axis of vessel, via rolling gantry support 83 which is powered via motor 84.

In addition to longitudinal and transversal movement (relative to the longitudinal axis of the vessel), the vertical position 78 of the floating cable puller 79 may be varied via the vertical support member 80, which is telescoping, having an upper support piece 81 which slidingly engages a lower support piece 82. The telescoping action may be provided via reciprocating hydraulic piston, electronic servo, or a multitude of other off-the-shelf technologies.

The vertical (up-down), transversal (side-side), and longitudinal (front-rear & visa- versa) may be controlled via control chassis 90, which controls the respective motors or other motivating means for trolley positioning discussed supra. Infrared, RF, or wire 89 may be utilized to communicate the commands from the control box to the trolley assembly. An individual 91 or an automated system, such as a computer, may control the position of the system.

In addition, the control chassis or automated system also should control the floating cable puller, including the selective operation, such as on-off, speed, and direction, and spacing of the wheels, as necessary and desirable.

Generally, in forming the pile 68 of cable in the cable bin, the trolley only need be positioned in spaced relation with the pile, in about the center of the bin, in a vertical position about the height of the cable pile, and not too fast cable puller speed, and the cable will generally pile itself in a uniform manner.

Figure 8:
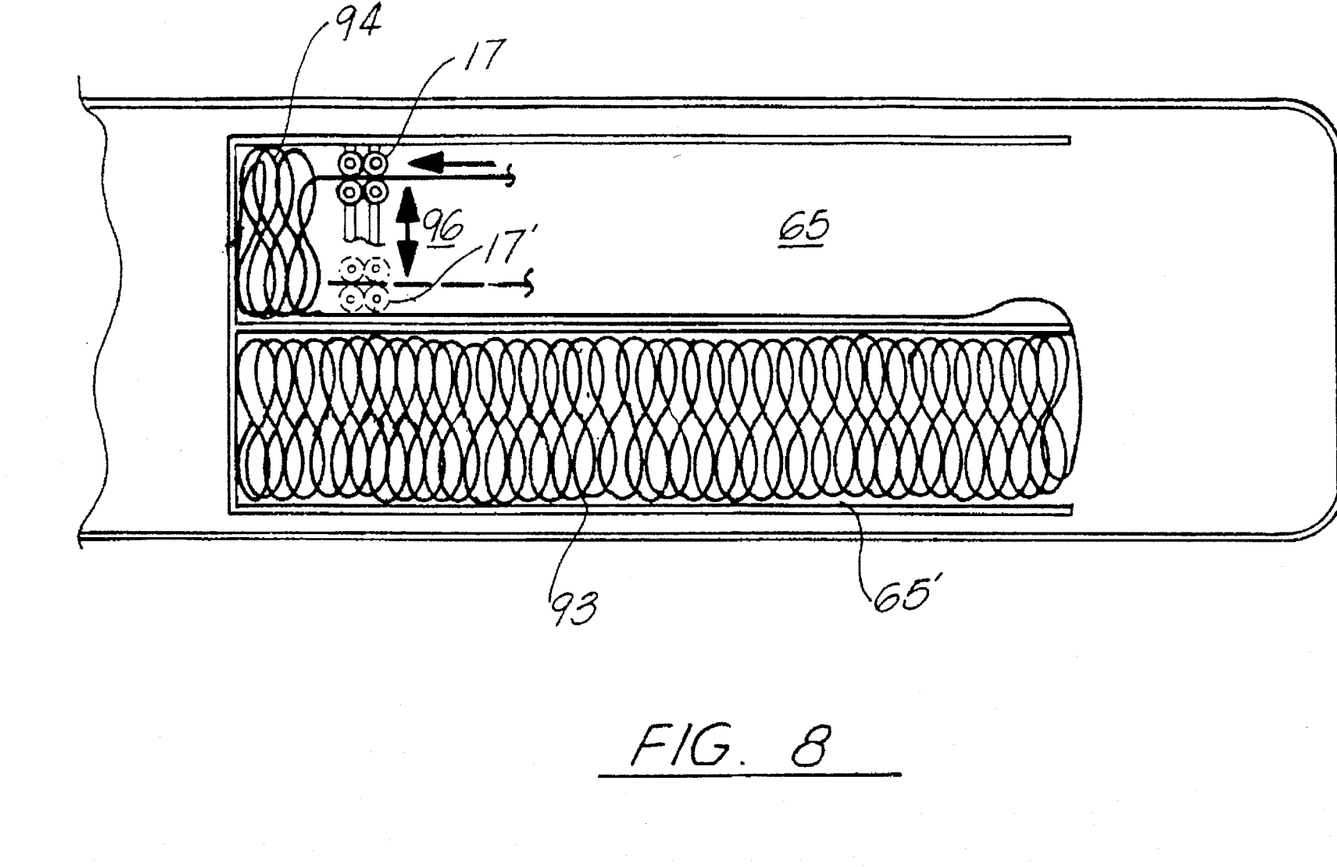
FIG. 8 provides a top, cross-sectional view of the cable deployment retrieval system of FIG. 1, illustrating the lump storage of cable in the cable storage bins, and the relative movement of trolley.

Referring to FIG. 8, the cable, once piled 93 to fill one bin 20 (in cases where split bins are utilized), the trolley is then motivated to the front of the other bin 21, forming a new pile 94. If the cable begins to knot or bind during piling, or if the type of cable is difficult to motivate, the trolley 17 may be motivated to move 17' along the gantry in a side to side movement 96, as a speed consistent with the speed of the cable puller, to in effect spool the cable onto the pile in an unbinding fashion. This process may be automated into various programmed routines, depending upon the type and size of cable bin, cable type, and operating conditions.

Figure 8A:
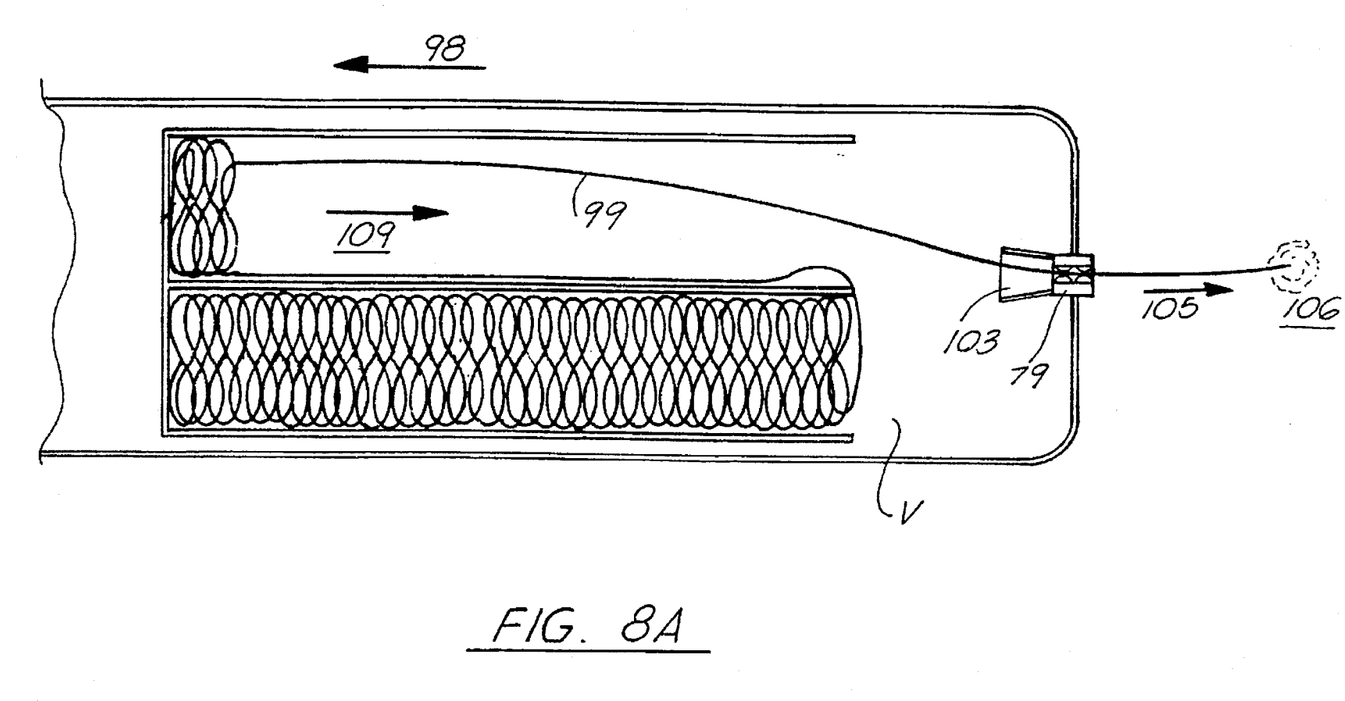
FIG. 8a provides a top, cross-section al view of the cable deployment/retrieval system of FIG. 1, illustrating the deployment of seismic cable from the cable storage bins, through the cable trolley system, and off the vessel.
Figure 9:
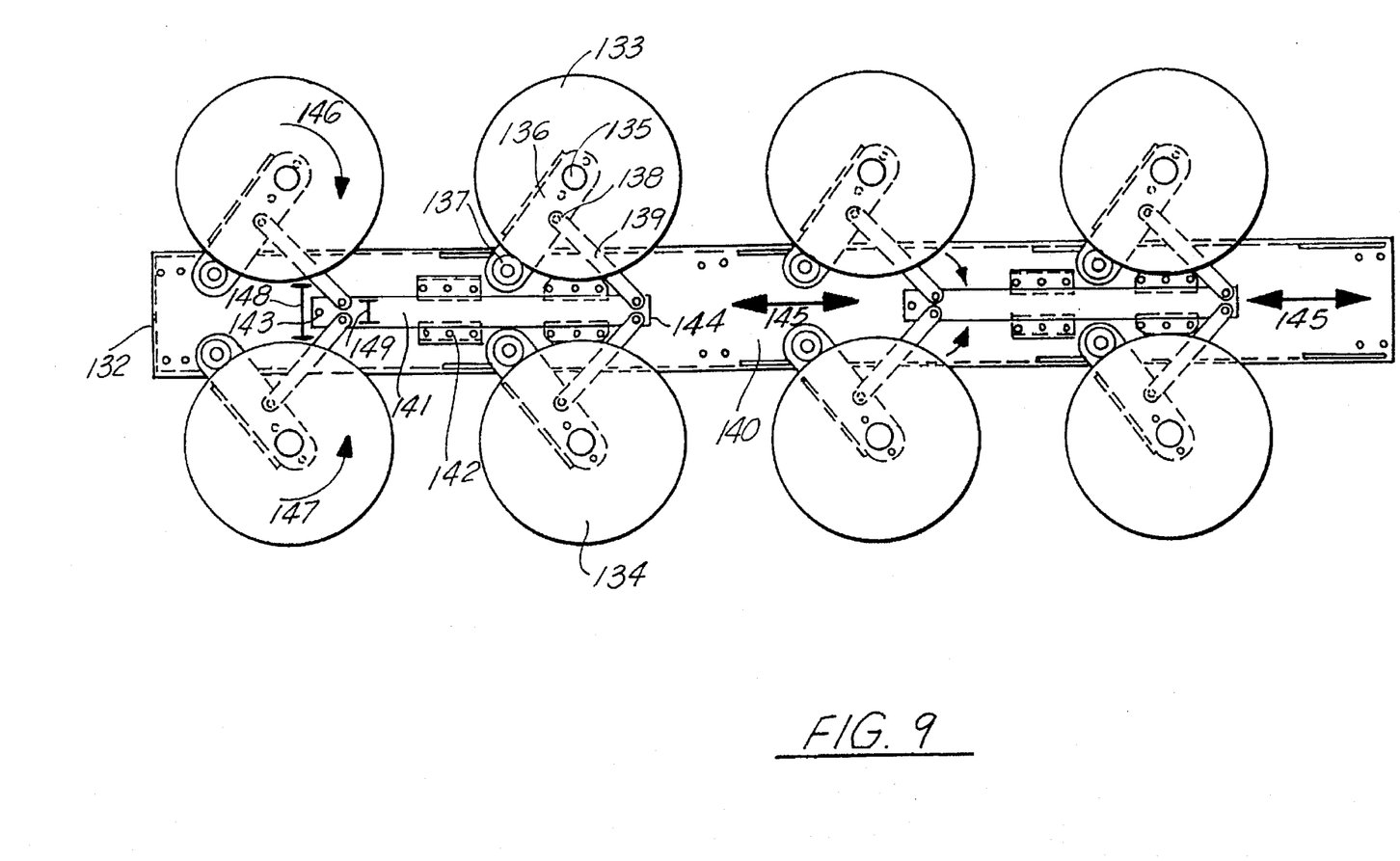
FIG. 9 provides a cut-away view of the mechanics of an exemplary cable deployment retrieval system, detailing an exemplary means to vary the space between the cable puller wheels.
Figure 9A:
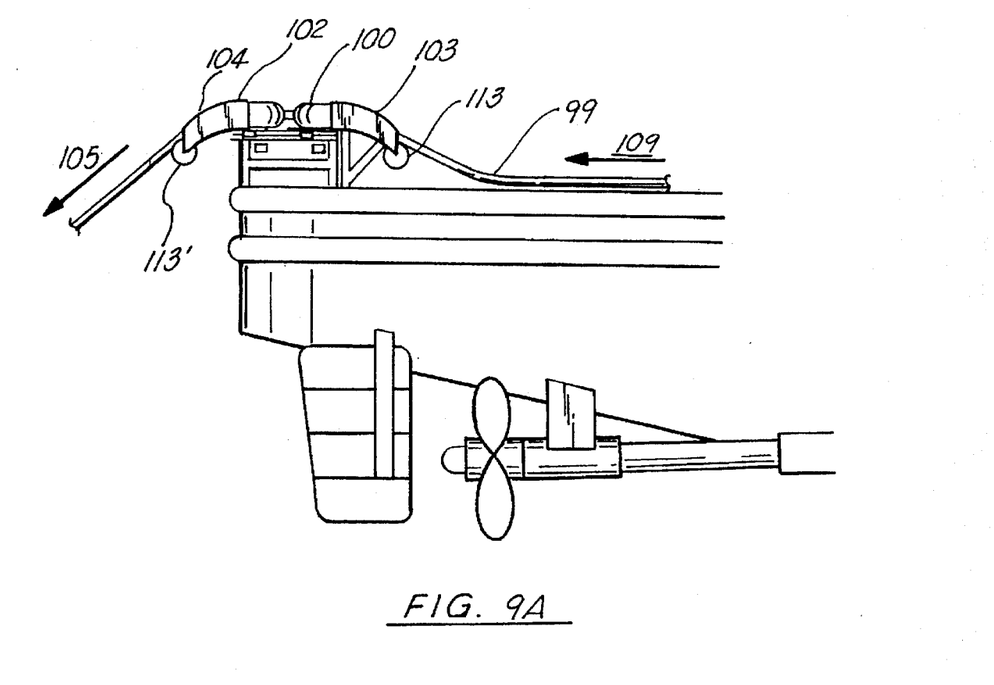
FIG. 9a provides a side view of an alternative embodiment of a cable puller mounted upon the stern of the main deck of the vessel, for deploying cable from the cable storage bin into the water.

Now referring to FIGS. 8A and 9A, to deploy the cable to sea from the storage bin, the trolley is positioned at the stern of the vessel, such that the floating cable puller is generally adjacent to the rear end of the vessel, and may be locked into place in a predetermined deployment area, as desired, via locking pin or the like.

The first end of the cable is then threaded through the cable puller, and the puller then initiated so as to pull 109 the cable 99 out 105 of the vessel into the water 106. The vessel V may be powered in a forward direction 98 to evenly spool out the cable. A ramp 103 may be provided to urge the cable up into the wheel puller area of the cable puller 79, which ramp could removeably attach to the cable puller, as desired. During cable deployment operations, the floating cable puller speed control may be linked to the speed of the vessel, for optimal deployment of the cable.

For utilizing the trolley assembly/floating cable puller to stow the cable, an exemplary methodology is set forth below; it is noted that the ingress/egress ports of the floating cable puller are effectively reversed when the direction of rotation of the wheels is reversed. In use, the operator:

a. utilizes said control means for selectively positioning said floating cable puller to the general vicinity of the cable storage area, with said cable egress port pointed generally towards said cable storage area;

b. threads a cable through said cable ingress port of said floating cable puller;

d. initiates said floating cable puller, allowing said floating cable puller to pull said cable, urging said cable through said egress port into said cable storage area;

e. allowing said cable puller to pile said cable in said storage area;

f. manipulates the position of said floating cable puller via said control means, selectively depositing cable in said cable storage area in a uniform pile;

g. repeating steps e–f until the full length of cable has been placed into said cable storage area.

In addition, the operator may utilize said control means to manipulate the vertical position of said floating cable puller above said deck, such that said floating cable puller is of about equal height to the desired height of said cable pile in said cable bin; this could help in the optimal piling of cable in said cable storage area.

In deploying the cable from the storage area to the water, the operator follows the steps of:

a. maneuvering said floating cable puller, via said control means, such that said cable puller is positioned adjacent to said stern of said vessel, with said egress port pointing toward said body of water, and said ingress port pointing generally toward said cable storage area;

b. threading an end of said cable in said cable storage bin through said cable ingress port of said floating cable puller;

c. initiating said floating cable puller, allowing said floating cable puller to pull said cable, urging said cable through said egress port into said cable storage area;

d. urging said cable into said body of water e. repeating steps c–d until the full length of said cable has been deposited in said body of water.

Figure 10:
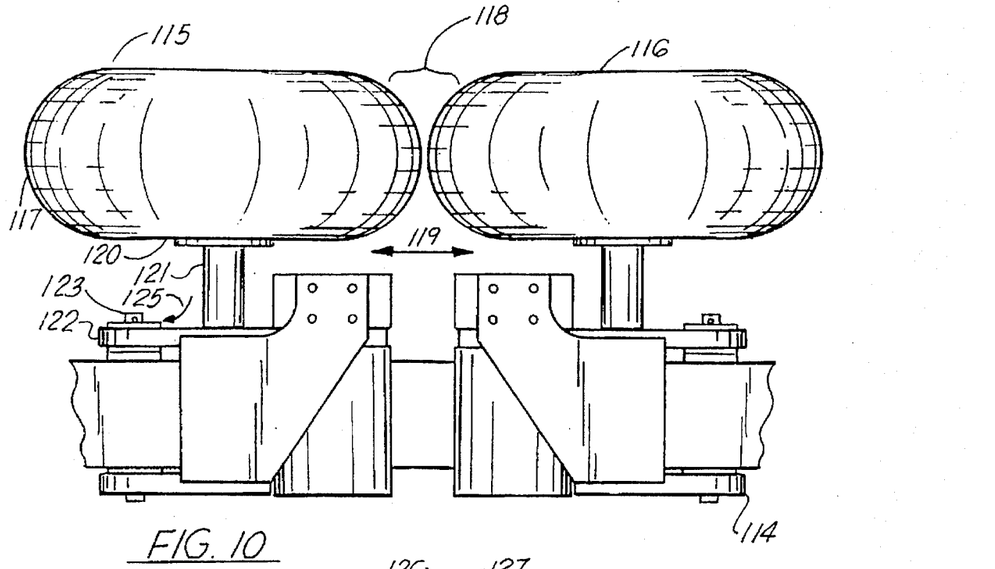
FIG. 10 provides an end view of the cable deployment/ retrieval system of the invention of FIG. 1, illustrating the position tires in a cable puller arrangement as utilized in the present invention.

Referring now to FIG. 10, the front and rear cable pullers on the upper level deck, and the floating cable puller on the main deck all utilize a common cable pulling system, which provides a superior means of pulling seismic cable, and the relatively large diameter connectors associated therewith.

As shown, the cable puller 114 includes first 115 and second 116 sets of horizontally situated tires on hubs 120, the tires positioned to form a gripping space 118 therebetween, each of the tires further having an outer diameter gripping face 117. While varying the space between the tires 118 is not particularly necessary with the present system, as will be more fully explained below, it may be advantageous to vary said spacing, and accordingly, the preferred, exemplary embodiment of the invention includes such a means to vary 119 the spacing between the tires.

As further shown, each of the hubs is supported by a vertical shaft 121 which rests upon support member 122, which in turn is pivotally connected 123 to the support chassis; pivoting 125 of this support member 122 results in movement of the supported wheel member, resulting in a varying 119 of the spacing between the wheels 115, 116.

Figure 11:
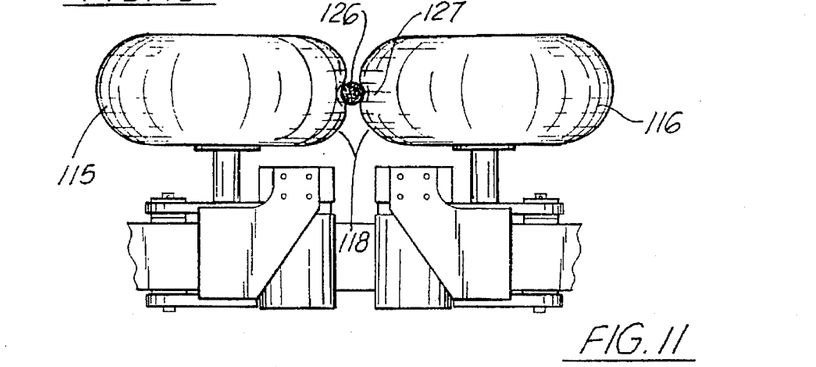
FIG. 11 provides an end view of the cable deployment/ retrieval system of the invention of FIG. 1, illustrating the position of two tires in a cable puller arrangement as utilized in FIG. 10, with an exemplary seismic cable situated therebetween, as it would be pulled by the rotation of said tires, as well as the relative deflection said tires associated therewith.

Referring now to FIG. 11, the tires on the cable pullers utilized in the present invention are configured to be relatively oversized when compared to other, prior art tires, and further said tires are filled to an air pressure less than what one would likely normally utilize in most applications involving said tires. For example, the exemplary embodiment of the present invention utilizes size twenty-two inch size, Carlisle brand tires, filled to 6 psi, with an anticipated acceptable PSI range of 4–8 PSI. The current tires being utilized have a knobby tread, which has been found to work well. These types of tires are believed to be utilized with lawn tractors and the like, and are believed to have a recommended pressure of 12–14 PSI for such applications, so the present system is utilizing tires which would be considered underinflated by factory standards.

With the present tire arrangement, it has been found that the cable puller tires 115, 116 provide a better, yet less damaging friction grip on the cable 126, the tires deflecting 127 to accommodate the cable during their rotational/pulling operations, without the need for space adjustments 118.

Figure 12:
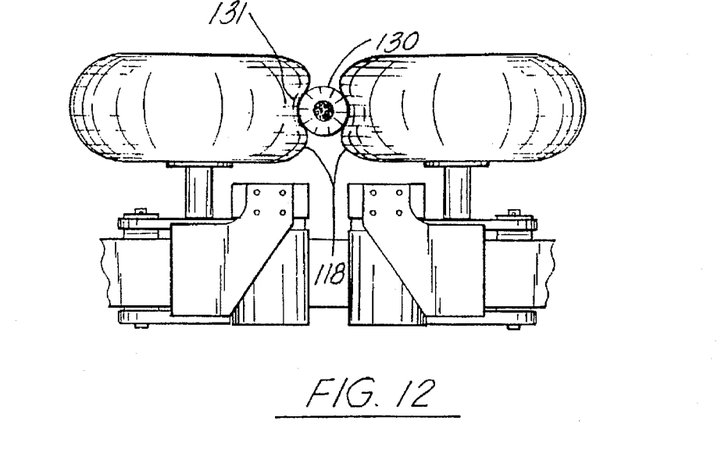
FIG. 12 provides an end view of the cable deployment/ retrieval system of the invention of FIG. 1, illustrating the position of two tires in a cable puller arrangement as utilized in FIG. 10, with an exemplary seismic cable connector situated therebetween, as It would be pulled by the rotation of said tires, as well as the relative deflection said tires associated therewith.

Further, as shown In FIG. 12, when the cable connector 130 (28 in FIG. 3) passes between the tires, said tires merely deflect 131 more, providing a relatively soft, yet firm grip to the connector in a non-damaging, but effective pulling operation. Again, the spacing 118 between the tires need not be mechanically adjusted; the tire merely deflects, and the connector is pulled therethrough.

FIG. 9 illustrates an exemplary mechanical means of spacing the opposing pairs of tires in the cable puller arrangement as used in the present system, including the front and rear cable pullers on the upper level deck as well as the floating cable puller on the main deck.

As shown, the base member 140 of the spacer member 132 supports first 133 and second 134 sets of opposing tires, each supported by a vertical shaft 135. A tire support member (under the tire shown) engages the shaft 135 at one end, and is pivotally connected 137 to the support member at the other end.

As further shown, the first end of a pivot member 139 is pivotally connected 138 to the medial area of the tire support member 136, the other end the other end connected to slider member 141, which has first 143 and second 144 ends.

The slider member is slidingly connected 142 to the base member 140, such that longitudinal movement 145 of the slider member, which may be powered via motor, cylinder, or servo, causes the respective pairs of gripping wheels to pivot closer together 146, 147 or spread further apart, from an open tire position 148 to a cable gripping position 149 depending upon the direction the slider bar is urged.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A cable handling system for retrieving cable from a body of water to a marine vessel having a bow and stern, a longitudinal axis, an upper deck, a lower deck, and a cable storage area, comprising:

a generally vertically situated retrieval wheel located near the upper deck of the vessel, generally adjacent to the bow of said vessel, said retrieval wheel having an axis rotatingly supported by a frame, said wheel further including a hub portion;

a front cable puller located upon said upper deck of said vessel, said front cable puller comprising first and second, horizontally situated sets of powered, rotatable wheels, paired so as to form a linear cable passage therethrough for pulling said cable, said linear cable passage of said front cable puller situated generally adjacent to and aligned with said hub portion of said retrieval wheel;

a rear cable puller situated upon said upper deck in the general vicinity of the stern of the vessel;

a generally horizontally situated cable tray located upon the upper deck of said vessel, said cable tray aligned with the longitudinal axis of the vessel, said cable tray situated between said front cable puller and said rear cable puller, said cable tray generally aligned with said linear cable passage of said front cable puller, for guiding said cable from said front cable puller to said rear cable puller;

chute means for guiding said cable from said rear cable puller to the lower deck, and the general vicinity of said cable storage area.

2. The cable handling system of claim 1, wherein said hub of said retrieval wheel is about nine feet in diameter.

3. The cable handling system of claim 2, wherein said retrieval wheel has coated about its hub a cushioning material.

4. The cable handling system of claim 3, wherein said cushioning material is vulcanized rubber.

5. The cable handling system of claim 1, wherein said hub of said retrieval wheel is between three and twenty feet in diameter.

6. The cable handling system of claim 1, wherein said front cable puller is formed of four pairs of wheels.

7. The cable handling system of claim 6, wherein said cable includes connectors of a larger diameter than said cable, and wherein said wheels comprise tires which are under inflated, so as to allow for a soft gripping of said cable, providing sufficient gripping for pulling said cable under normal operating conditions, while allowing said tires to give in with the passage of a larger diameter connector therethrough, without the necessity of mechanically varying the spacing between the tires.

8. The cable handling system of claim 1, wherein said cable tray is lined with low friction lining.

9. The cable handling system of claim 8, wherein said cable tray is lined with TEFLON sheet material.

10. The cable handling system of claim 1, wherein said rear cable puller comprises first and second, horizontally situated, powered, rotatable wheels, paired so as to form a linear cable passage therethrough for pulling said cable under normal operating conditions, said linear cable passage aligned with said cable tray and said chute means.

11. The cable handling system of claim 10, wherein said cable includes connectors of a larger diameter than said cable, and wherein said wheels comprise tires which are under inflated, so as to allow for a soft gripping of said cable, providing sufficient gripping for pulling said cable under normal operating conditions, while allowing said tiers to give in with the passage of a larger diameter connector therethrough, without the necessity of mechanically varying the spacing between the tires.

12. A cable handling system for retrieving cable from a body of water to a marine vessel having an upper deck, a lower deck, a longitudinal axis, a bow and stern, and a cable storage area, comprising:

cable aligning means for lifting and aligning said cable;

a front cable puller situated upon the upper deck of the vessel, said front cable puller comprising first and second, horizontally situated sets of powered, rotatable wheels, paired so as to form a linear cable passage therethrough for pulling said cable, said linear cable passage aligned with and situated adjacent to said cable aligning means;

a rear cable puller situated upon the upper deck of the vessel, generally adjacent to the stern of the vessel;

a generally horizontally situated cable tray situated upon the upper deck of the vessel in general alignment with the longitudinal axis of the vessel, said cable tray generally aligned with said linear cable passage of said front cable puller, for guiding said cable from said front cable puller to said rear cable puller;

chute means for guiding said cable from said rear cable puller to the lower deck and the general vicinity of said cable storage area.

13. The cable handling system of claim 12, wherein said front cable puller is formed of four pairs of wheels.

14. The cable handling system of claim 13, wherein said cable includes connectors of a larger diameter than said cable, and wherein said wheels comprise tires which are under inflated, so as to allow for a soft gripping of said cable, providing sufficient gripping for pulling said cable under normal operating conditions, while allowing said tires to give in with the passage of a larger diameter connector therethrough, without the necessity of mechanically varying the spacing between the tires.

15. The cable handling system of claim 13, wherein said tires are inflated to between four to eight pounds per square inch.

16. The cable handling system of claim 12, wherein said cable tray is lined with a low friction lining.

17. The cable handling system of claim 16, wherein said cable tray is lined with TEFLON sheet material.

18. The cable handling system of claim 12, wherein said rear cable puller comprises first and second, horizontally situated, powered, rotatable wheels, paired so as to form a linear cable passage therethrough for pulling said cable under normal operating conditions, said linear cable passage aligned with said cable tray and said chute means.

19. The cable handling system of claim 18, wherein said cable includes connectors of a larger diameter than said cable, and wherein said wheels comprise tires which are under inflated, so as to allow for a soft gripping so said cable, providing sufficient gripping for pulling said cable under normal operating conditions, while allowing said tires to give in with the passage of a larger diameter connector therethrough, without the necessity of mechanically varying the spacing between the tires.

* * * * *